United States Patent
Xie

(10) Patent No.: US 8,260,153 B2
(45) Date of Patent: Sep. 4, 2012

(54) METHOD AND APPARATUS FOR POLARIZATION-DIVISION-MULTIPLEXED OPTICAL COHERENT RECEIVERS

(75) Inventor: Chongjin Xie, Monmouth County, NJ (US)

(73) Assignee: Alcatel Lucent, Paris (FR)

( * ) Notice: Subject to any disclaimer, the term of this patent is extended or adjusted under 35 U.S.C. 154(b) by 349 days.

(21) Appl. No.: 12/635,129

(22) Filed: Dec. 10, 2009

(65) Prior Publication Data

US 2011/0142449 A1 Jun. 16, 2011

(51) Int. Cl.
*H04B 10/06* (2006.01)
(52) U.S. Cl. .................. 398/202; 398/208
(58) Field of Classification Search .......... 398/202, 398/208
See application file for complete search history.

(56) References Cited

U.S. PATENT DOCUMENTS

2008/0152361 A1* 6/2008 Chen et al. .............. 398/205

FOREIGN PATENT DOCUMENTS

JP 11-239083 * 8/1999

OTHER PUBLICATIONS

Haijan et al, "Adaptive Equalization for Mobile Communication System Based on Constant Modulus Algorithm", Feb. 2001, IEEE, pp. 1609-1613.*

* cited by examiner

*Primary Examiner* — Leslie Pascal
(74) *Attorney, Agent, or Firm* — E. J. Rosenthal

(57) ABSTRACT

The singularity problem of the constant modulus algorithm (CMA) equalizer may be overcome by implementing the CMA equalizer as a two-stage equalizer, with the first stage being a modified version of a CMA equalizer and the second stage being a conventional CMA equalizer. The first stage may be made up of four sub-equalizers, of which only two of the sub-equalizers are independent, i.e., uncorrelated to each other. This first stage equalizer may compensate for PMD. The second stage equalizer is a conventional CMA equalizer made up of four sub-equalizers that are adjusted independently. This second stage equalizer may compensate for polarization-dependent loss (PDL) and any residual CD that is not fully compensated for by a CD compensator before the two-stage equalizer. Advantageously, as the determinant of the first stage never approaches zero, the singularity problem of a conventional CMA single-stage-only equalizer is avoided by the two-stage equalizer.

21 Claims, 5 Drawing Sheets

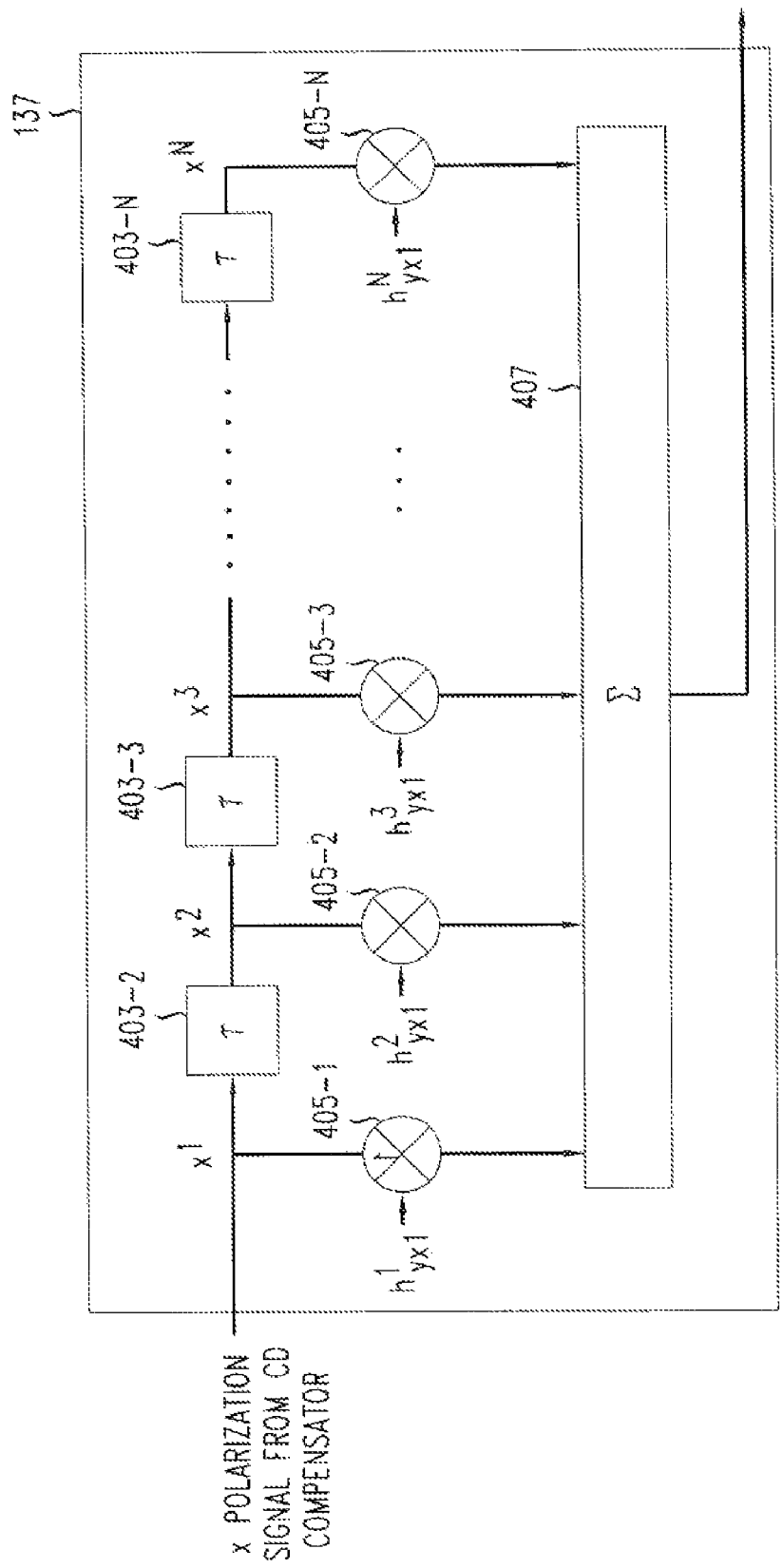

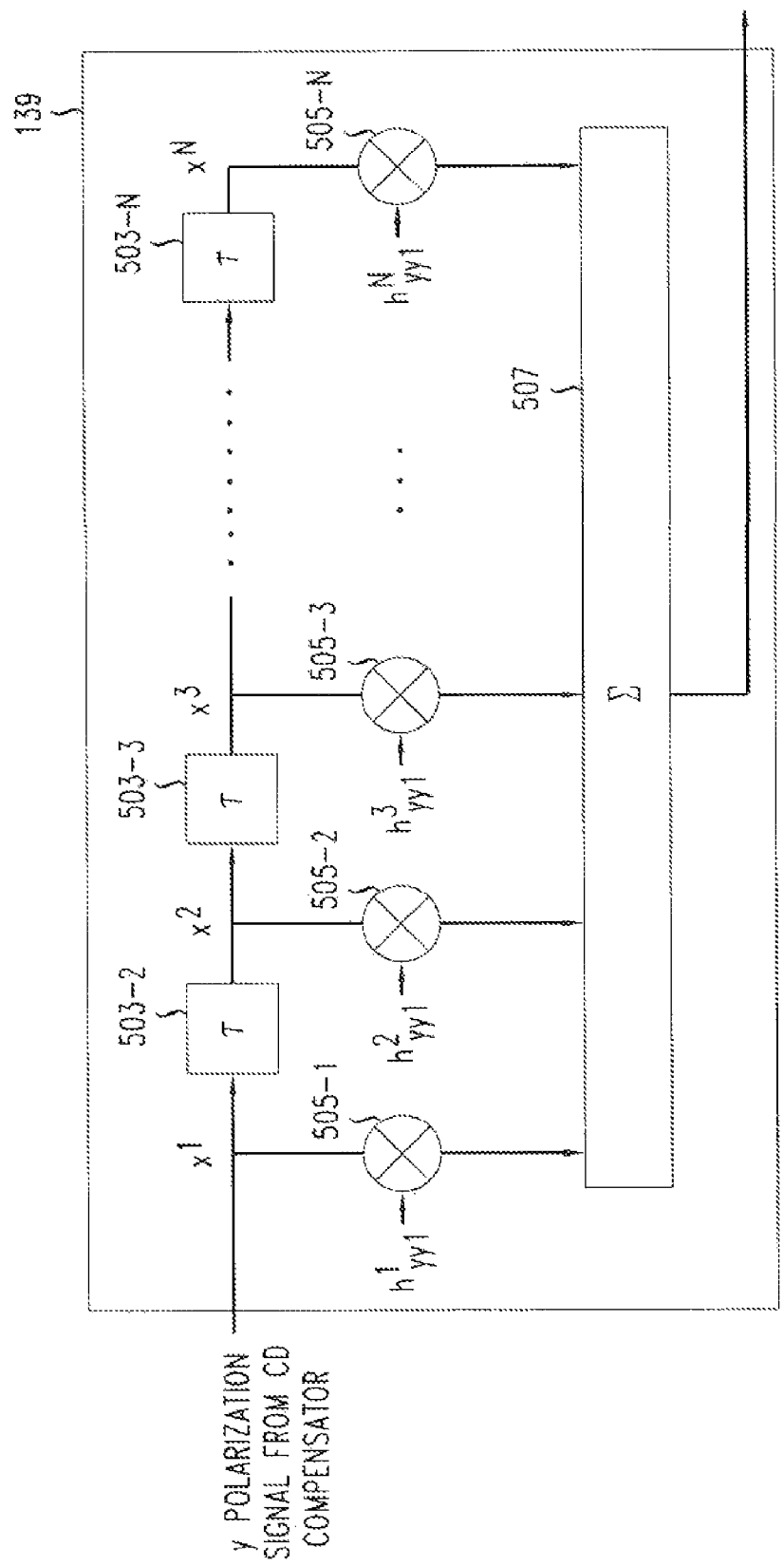

US 8,260,153 B2

METHOD AND APPARATUS FOR POLARIZATION-DIVISION-MULTIPLEXED OPTICAL COHERENT RECEIVERS

TECHNICAL FIELD

This invention relates to optical communications, and more particularly, to optical communications using polarization-division-multiplexing.

BACKGROUND OF THE INVENTION

As is well known, an optical signal may have two orthogonal polarization states, each of which may have different properties. Sometimes such polarization states are intentionally introduced, such as in creating a polarization-multiplexed signal in which the two orthogonal polarization states of the optical carrier are arranged so that each carries different data in order to double the spectral efficiency. Such a polarization-multiplexed signal has two so-called "generic" polarization components, each of which carries a single data modulation. Note that by a generic polarization component it is generally intended the signal at the point at which the modulation of that polarization component is completed. It should be appreciated that each generic polarization component may initially, or otherwise, exist separate from the other generic polarization component with which it is later combined. It should also be appreciated that the phase of the generic need not be constant.

Polarization-division-multiplexed optical communication systems using digital coherent detection are promising candidates for use in next generation optical networks.

Unfortunately, the polarization orientations of the generic signal components are generally changed by the birefringence of the fiber, and possibly other fiber properties, during the passage of the signal over the optical path. Such changes may be time varying because at least the fiber birefringence is typically a function of various factors such as ambient temperature, mechanical stress, and so forth, which may vary over time and be different at various points of the transmission path. As a result, the polarization orientation of each of the generic signal components is generally unknown at the receiver.

Sometimes, undesirably, the fiber birefringence is so large that polarization-mode dispersion (PMD) is caused, i.e., a generic optical signal component is decomposed into two orthogonal polarization components along the two principle state of polarization (PSP) axes of the fiber, along one of which the light travels at its fastest speed through the fiber and along the other of which the light travels at its slowest speed through the fiber. In such a case, not only may the phase relationship between the two polarization components be time varying, but also each of the two orthogonal polarization components may arrive at the receiver at different times due to the PMD-induced differential group delay (DGD) between the two PSP axes. Note that, actually, as suggested above, each small section of the fiber behaves as if it is its own mini fiber that introduces its own DGD between the two PSP axes. Thus, for a particular fiber or optical link, PMD is a stochastic effect, and the PMD-induced DGD may also be time varying. Optical communication systems also suffer from polarization dependent loss (PDL). PDL mainly comes from optical components such as couplers, isolators and circulators, in which insertion loss is dependent on polarization states of input signals. PDL causes the fluctuation of optical signal-to-noise-ratio (OSNR) and performance differences between the two generic polarization components. PDL is a stochastic phenomenon and PDL-induced penalties may also be time varying.

Other linear effects distort optical signals transmitted over optical fibers. Such effects include chromatic dispersion (CD). Optical compensation methods and electrical compensation methods are typically employed to reduce signal distortion that arises due to CD or PMD in direct detection systems and coherent detection systems, respectively.

In prior art polarization-division-multiplexed optical coherent communication systems, transmission impairments, such as chromatic dispersion, polarization-mode dispersion, and polarization dependent loss, may be compensated for electronically using digital signal processing, and polarization demultiplexing of the generic polarizations may also performed in the electrical domain by digital signal processing. Unfortunately, such prior art systems suffer from various disadvantages. For example, *Digital Filters For Coherent Optical Receivers By Savory*, published in Optics Express vol. 16, No. 2, 2008 pp. 804-817, pointed out that the prior art systems suffer from the so-called "singularity problem", which means that the output two polarization tributaries tend to converge to the same source. The same problem is also encountered in the system described in Initial tap setup of *Constant Modulus Algorithm For Polarization De-Multiplexing In Optical Coherent Receivers* by Lin et al. published in OSA/OFC/NFOEC 2009 as paper number OMT2.

SUMMARY OF THE INVENTION

I have recognized that the singularity problem may be overcome by implementing the constant modulus algorithm (CMA) equalizer that is employed in the receiver as a two-stage equalizer, with the first stage being a modified version of a CMA equalizer and the second stage being a conventional CMA equalizer. For example, in one embodiment of the invention, the first stage modified equalizer is made up of four sub-equalizers, of which only two of the sub-equalizers out of the four are independent, i.e., uncorrelated to each other. This first stage equalizer is employed to compensate for PMD. The second stage equalizer is a conventional CMA equalizer made up of four sub-equalizers that are adjusted independently in the conventional manner. Furthermore, this second stage equalizer compensates for polarization-dependent loss (PDL) and any residual CD that is not fully compensated for by a CD compensator which is before the two-stage equalizer. Advantageously, as the determinant of the first stage never approaches zero, the singularity problem of a conventional CMA single-stage-only equalizer is avoided by the two-stage equalizer.

BRIEF DESCRIPTION OF THE DRAWING

In the drawing:

FIGS. 2, 3, 4, and 5 each shows an exemplary embodiment of a prescribed sub-equalizer of FIG. 1.

DETAILED DESCRIPTION

Figure 1:
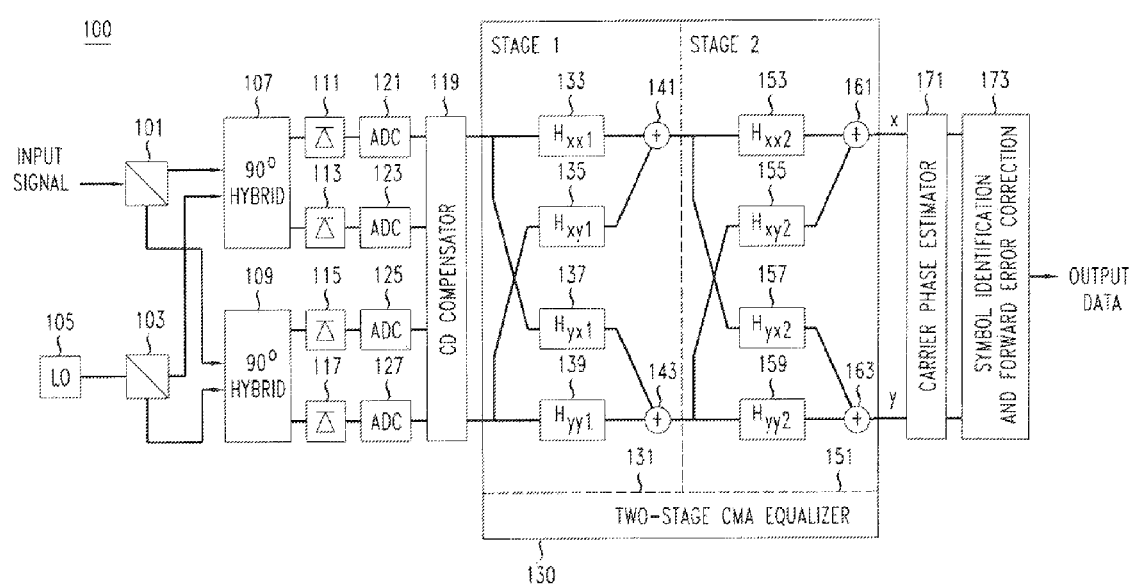
FIG. 1 shows an exemplary receiver for a polarization-division-multiplexed optical communication system which uses digital coherent detection and is arranged in accordance with the principles of the invention.

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

Additionally, unless otherwise explicitly specified herein, any lens shown and/or described herein is actually an optical system having the particular specified properties of that lens. Such an optical system may be implemented by a single lens element but is not necessarily limited thereto. Furthermore, as is well known in the art, the functionality of a curved mirror may be realized via a combination of lenses and mirrors and vice versa. Moreover, any arrangement of optical components that are performing a specified function, e.g., an imaging system, gratings, coated elements, and prisms, may be replaced by any other arrangement of optical components that perform the same specified function. Thus, unless otherwise explicitly specified here, all optical elements or systems that are capable of providing specific function within an overall embodiment disclosed herein are equivalent to one another for purposes of the present disclosure.

In the description, identically numbered components within different ones of the FIGs. refer to the same components.

In accordance with the principles of the invention, the singularity problem may be overcome by implementing the constant modulus algorithm (CMA) equalizer that is employed in the receiver as a two-stage equalizer, with the first stage being a modified version of a CMA equalizer and the second stage being a conventional CMA equalizer. FIG. 1 shows exemplary receiver 100 for a polarization-division-multiplexed optical communication system which uses digital coherent detection and is arranged in accordance with the principles of the invention. Shown in FIG. 1 are a) polarization beam splitters 101 and 103; b) local oscillator 105; c) optical hybrids 107 and 109; d) photodetectors 111, 113, 115, and 117; e) analog-to-digital converters (ADC) 121, 123, 125, and 127; f) chromatic dispersion (CD) compensator 119; g) two-stage CMA equalizer 130, including first stage equalizer 131 and second stage equalizer 151; h) carrier phase estimator 171; and i) symbol identification and forward error correction (FEC) unit 173.

More specifically, polarization beam splitter 101, which may be a conventional polarization beam splitter, receives a polarization multiplexed signal which was transmitted originally as two generic polarization components over a transmission medium, e.g., a fiber, to receiver 100. The polarization multiplexed signal is typically received via an input port receiver 100. The transmission medium imparted various distortions to the originally transmitted signal resulting in the received signal. The input signal may be one channel or a few channels of a wavelength division multiplexed (WDM) signal. Polarization beam splitter 101 separates the input signal into two orthogonal polarization outputs which are each supplied, respectively, to optical hybrids 107 and 109.

Local oscillator 105, which may be a conventional optical local oscillator, generates an optical signal at the nominal frequency of the particular channel from the received input that is to be processed. The optical signal generated by local oscillator 105 is split into two polarizations by polarization beam splitter 103, which may be a conventional polarization beam splitter. Each of the polarizations produced by polarization beam splitter 103 is supplied to a respective one of optical hybrids 107 and 109 such that optical hybrid 107 receives a first polarization derived from the input signal and the same corresponding polarization derived from the signal produced by local oscillator 105 and optical hybrid 109 receives the second polarization derived from the input signal and the same corresponding polarization derived from the signal produced by local oscillator 105.

Optical hybrids 107 and 109, which may be conventional, are typically so-called 90 degree optical hybrids. Each optical hybrid combines the signal and local-oscillator inputs it receives and provides its output through several ports with appropriate phase shifts introduced into different branches. Optical hybrids are well known, see for example www.en-wikipedia.com/wiki/optical_hybrid, and may be implemented in various ways, e.g., as an optical wave guide, an I/Q coupler, which may be implemented using a 3×3 coupler, or as described by Tsukamoto et al in "Coherent Demodulation of Optical Multilevel Phase-Shift-Keying Signals Using Homodyne Detection and Digital Signal Processing" published in IEEE Photonics Technology Letters, Vol. 18, No. 10, May 2006.

Photodetectors 111, 113, 115, and 117 each receives at least one respective optical output from optical hybrids 107 or 109 and converts the optical signal it receives into an analog electrical signal. Photodetectors 111, 113, 115, and 117 may be single ended or balanced. In the event that any of photodetectors 111, 113, 115, and 117 are balanced photodetectors, it is necessary that such a balanced photodetector receive two optical outputs from the one of optical hybrids 107 or 109 supplying it. Thus, the optical hybrids and photodetectors are preferable properly matched.

The electrical signals produced by each of photodetectors 111, 113, 115, and 117 are supplied to a respective one of analog-to-digital converters (ADC) 121, 123, 125, and 127. Typically, even a balanced photodetector provides only a single electrical output, e.g., by combining the results from each of its constituent photodectors. Each of analog-to-digital converters 121, 123, 125, and 127 produces a digital value representative of the analog electrical signal received from its corresponding respective one of photodectors 111, 113, 115, and 117.

For the purpose of discussion herein, reference will be made to the outputs of ADCs 121 and 123 as corresponding to the x polarization and to the outputs of ADCs 125 and 127 as corresponding to the y polarization. In addition, the output of ADC 121 is designated as the I output for the x polarization while the output of ADC 123 is designated as the Q output for the x polarization. Similarly, the output of ADC 125 is designated as the I output for the y polarization while the output of ADC 127 is designated as the Q output for the y polarization Chromatic dispersion (CD) compensator 119 receives the digital values from each of ADCs 111, 113, 115, and 117. Chromatic dispersion (CD) compensator 119, which may be conventional, e.g., it can be implemented as a finite impulse response (FIR) filter, removes the effects of chromatic dispersion. Typically, the x polarization and the y polarization are processed separately, so there may be two distinct units, e.g., FIR filters, performing the compensation of chromatic dispersion within chromatic dispersion (CD) compensator 119, even when the effect of the chromatic dispersion is the same on both of the x polarization and the y polarizations. CD compensator 119 supplies a single output for the x polarization and a single output for the y polarization. These outputs are supplied to two-stage CMA equalizer 130, and in particular to first stage equalizer 131, in the manner shown.

Note that, optionally, nonlinearity compensation may also be performed in CD compensator 119, making a CD and nonlinearity compensator. Alternatively, nonlinearities may be compensated for prior to CD compensator 119 or after it but prior to two-stage CMA equalizer 130.

First stage equalizer 131 and second stage equalizer 151 together are arranged to implement the constant modulus algorithm (CMA) equalizer performed by two-stage CMA equalizer 130 in accordance with the principles of the invention. First stage equalizer 131 is a modified version of a CMA equalizer while second stage equalizer 151 is a conventional CMA equalizer. Preferably, two-stage CMA equalizer would be implemented in dedicated hardware, such as on an application specific integrated circuit (ASIC), although it may also be implement in various other ways such as a field programmable gate array (FPGA) or other signal processing integrated circuit. While use of software on an appropriate processor is not viewed as precluded, it is presently not recommended due to the high speed requirements.

As shown in the embodiment of the invention of FIG. 1 first stage equalizer 131 is a modified CMA equalizer made up of sub-equalizers 133, 135, 137, and 139, of which only two sub-equalizers out of the four are independent, i.e., uncorrelated to each other and combiners 141 and 143. More specifically, either sub-equalizers 133 and 135, which are for the output of the generic x polarization are independent and sub-equalizers 137 and 139 are not independent or sub-equalizers 137 and 139, which are for the output of the generic y polarization are independent and sub-equalizers 133 and 135 are not independent. Which of the two sub-equalizers is independent is set by designing their coefficients, and the coefficients of the remaining sub-equalizers fall out as a function of the design of the first two.

Sub-equalizers 133 and 137 each receive as an input the output from CD compensator 119 that corresponds to the x polarization while sub-equalizers 135 and 139 each receive as an input the output from CD compensator 119 that corresponds to the y polarization.

Each of sub-equalizers 133, 135, 137, and 139 has a respective transfer function as follows: for sub-equalizer 133, its transfer function is $H_{xx1}$; for sub-equalizer 135, its transfer function is $H_{xy1}$; for sub-equalizer 137, its transfer function is $H_{yx1}$; and for sub-equalizer 137, its transfer function is $H_{yy1}$. Given that the goal is a constant modulus for the independent output, e.g., a, which if normalized a would have a value of 1, each of these transfer functions is adjusted according to its respective associated one of the following equations:

$$H_{xx1}(t+\Delta t) = H_{xx1}(t) - \mu \frac{\partial(\varepsilon_x^2)}{\partial H_{xx1}}$$

$$H_{xy1}(t+\Delta t) = H_{xy1}(t) - \mu \frac{\partial(\varepsilon_x^2)}{\partial H_{xy1}}$$

$$H_{yx1}(t+\Delta t) = -H_{xy1}^*(t+\Delta t)$$

$$H_{yy1}(t+\Delta t) = H_{xx1}^*(t+\Delta t)$$

where t is the current time period, e.g., current cycle, t+Δt represents the next time period, e.g., the next cycle, where Δt is the cycle time duration, $\varepsilon_x^2$ is the mean-square error $\varepsilon_x^2 = (a-|x'|^2)^2$ for the x generic, in the general case and $\varepsilon_x^2 = (1-|x'|^2)^2$ for the normalized case.

Figure 2:
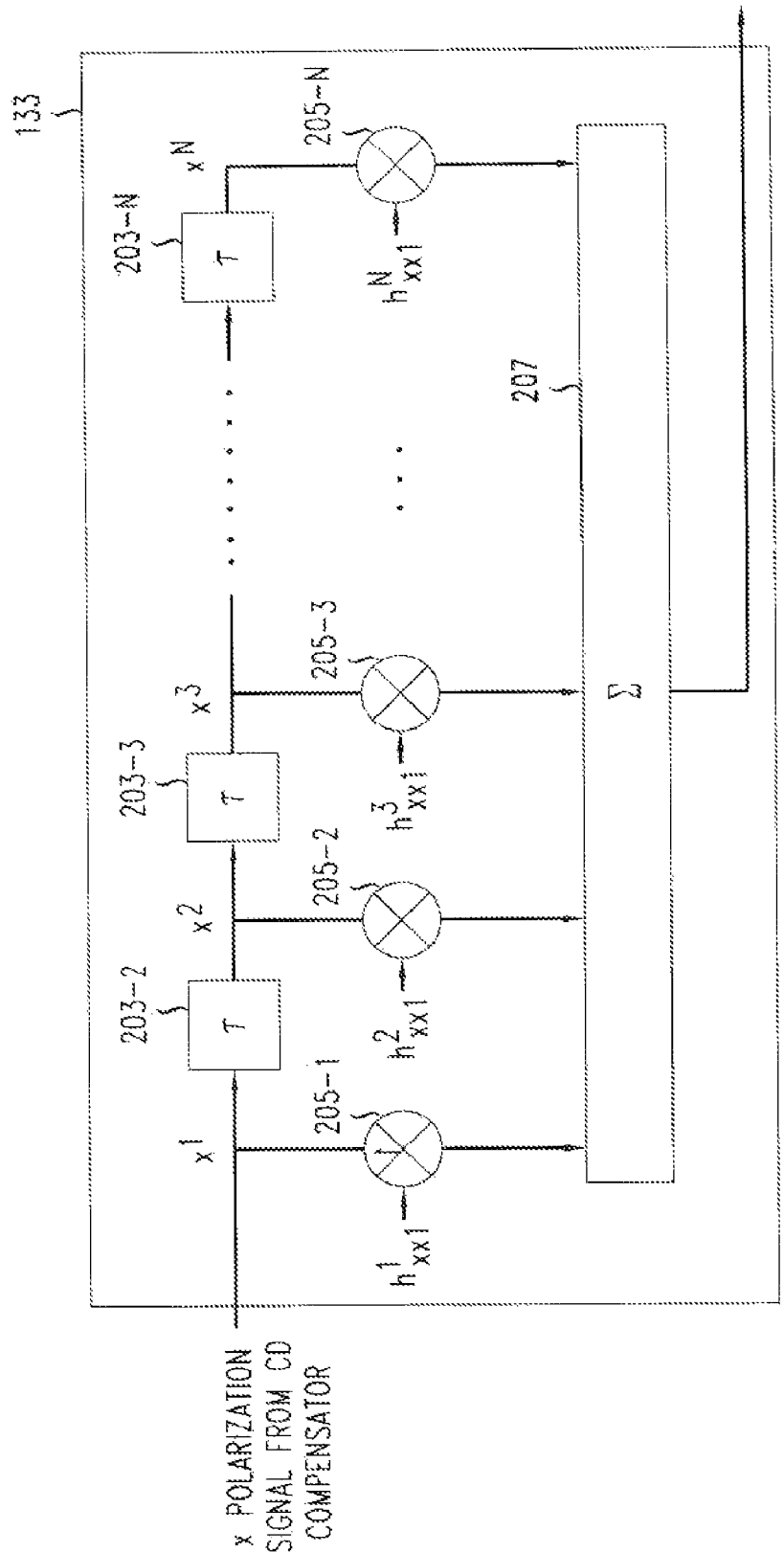

FIG. 2 shows an exemplary embodiment of sub-equalizer 133 having transfer function $H_{xx1}$. As shown, sub-equalizer 133 is a tapped delay equalizer, where N is the number of taps. Sub-equalizer 133 includes delays 203, including delays 203-2 through 203-N, multipliers 205, including multipliers 205-1 through 205-N and summer 207. The input signal to sub-equalizer 133 is, as noted hereinabove, the output from CD compensator 119 corresponding to the x polarization. Each of multipliers 205 receives a respective one of coefficients $h_{xx1}^n$, n=1 to N, from a storage unit, not shown, and multiplies it by the value received from either the input signal or the associated one of delays 203, e.g., the one having the same numerical suffix. The values of $h_{xx1}{}^n$ are typically updated by a feedback loop as a function of the error signal. The resulting products are summed by summer 207 and the result is supplied as the output of sub-equalizer 133.

Figure 3:
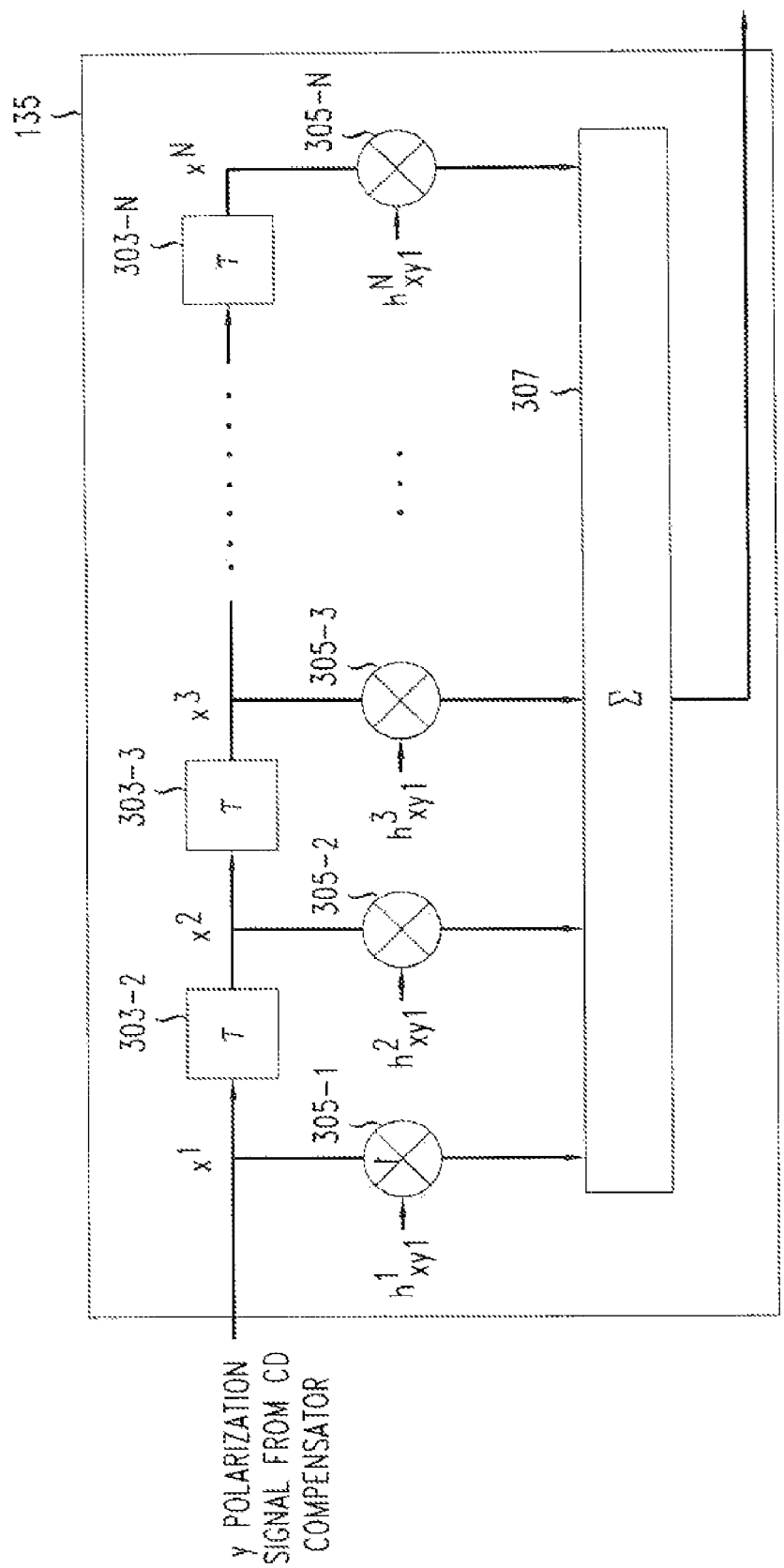

FIG. 3 shows an exemplary embodiment of sub-equalizer 135 having transfer function $H_{xy1}$. As shown, sub-equalizer 135 is a tapped delay equalizer, where N is the number of taps. Sub-equalizer 135 includes delays 303, including delays 303-2 through 303-N, multipliers 305, including multipliers 305-1 through 305-N and summer 307. The input signal to sub-equalizer 135 is, as noted hereinabove, the output from CD compensator 119 corresponding to the y polarization. Each of multipliers 305 receives a respective one of coefficients $h_{xy1}{}^n$, n=1 to N, from a storage unit, not shown, and multiplies it by the value received from either the input signal or the associated one of delays 303, e.g., the one having the same numerical suffix. The values of $h_{xy1}{}^n$ are typically updated by a feedback loop as a function of the error signal. The resulting products are summed by summer 307 and the result is supplied as the output of sub-equalizer 135.

FIG. 4 shows an exemplary embodiment of sub-equalizer 137 having transfer function $H_{yx1}$. As shown, sub-equalizer 137 is a tapped delay equalizer, where N is the number of taps. Sub-equalizer 137 includes delays 403, including delays 403-2 through 403-N, multipliers 405, including multipliers 405-1 through 405-N and summer 407. The input signal to sub-equalizer 137 is, as noted hereinabove, the output from CD compensator 119 corresponding to the x polarization. Each of multipliers 405 receives a respective one of coefficients $h_{yx1}{}^n$, n=1 to N, from a storage unit, not shown, and multiplies it by the value received from either the input signal or the associated one of delays 403, e.g., the one having the same numerical suffix. The values of $h_{yx1}{}^n$ are typically updated by a feedback loop as a function of the error signal. The resulting products are summed by summer 407 and the result is supplied as the output of sub-equalizer 137.

FIG. 5 shows an exemplary embodiment of sub-equalizer 139 having transfer function $H_{yy1}$. As shown, sub-equalizer 139 is a tapped delay equalizer, where N is the number of taps. Sub-equalizer 139 includes delays 503, including delays 503-2 through 503-N, multipliers 505, including multipliers 505-1 through 505-N and summer 507. The input signal to sub-equalizer 139 is, as noted hereinabove, the output from CD compensator 119 corresponding to the y polarization. Each of multipliers 505 receives a respective one of coefficients $h_{yy1}{}^n$, n=1 to N, from a storage unit, not shown, and multiplies it by the value received from either the input signal or the associated one of delays 503, e.g., the one having the same numerical suffix. The values of $h_{yy1}{}^n$ are typically updated by a feedback loop as a function of the error signal. The resulting products are summed by summer 507 and the result is supplied as the output of sub-equalizer 139.

For sub-equalizers 133 and 139, the initial coefficient values may be selected or arbitrary values other than all zeros. One exemplary selection of coefficient values could be all zeroes except one for a tap closest to the middle. This corresponds to the assumption that the x and y polarizations supplied as output from polarization beam splitter 101 are indeed the generic x and y polarizations. Sub-equalizers 135 and 137 may likewise have their initial coefficient values set to arbitrary values. However, it is possible for sub-equalizers 135 and 137 to have all of their initial coefficient values set to zero.

In first stage equalizer 131, the coefficients of the four sub-equalizers are updated each cycle using a modified CMA according to following equations. Although it is preferred that there be one input signal per cycle, so that updates to the coefficients occur for each input signal sample, how many input signal samples are incorporated in a cycle is at the discretion of the implementer. Note that in this modified CMA, only two of the 4 sub-equalizers, i.e., sub-equalizers 133 and 135, which are for the x polarization, are updated independently. The remaining two sub-equalizers, i.e., sub-equalizers 137 and 139, which are for the y polarization, are dependent upon the independently updated ones.

The coefficients of the four sub-equalizers, sub-equalizers 133, 135, 137, and 139, of first stage equalizer 131 may each be adjusted according to its respective associated one of the following equations:

$$h_{xx1}{}^i(t+\Delta t)=h_{xx1}{}^i(t)+\mu\epsilon_x x^i {}^* x', \ i=1,L,N$$

$$h_{xy1}{}^i(t+\Delta t)=h_{xy1}{}^i(t)+\mu\epsilon_x y^i {}^* x', \ i=1,L,N$$

$$h_{yx1}{}^i(t+\Delta t)=-[h_{xy1}{}^{N-i}(t+\Delta t)]^*, \ i=1,L,N$$

$$h_{yy1}{}^i(t+\Delta t)=[h_{xx1}{}^{N-i}(t+\Delta t)]^*, \ i=1,L,N$$

where t is the current cycle, t+Δt is the next cycle, where Δt is the cycle time duration, $$x' = \sum_{i=1}^{N} (h_{xx1}^i x^i + h_{xy1}^i y^i)$$

is the x polarization output of the equalizer, i.e., the output of combiner, e.g., adder, 141, the superscript * means complex conjugation, $\epsilon_x = (1-|x'|^2)$ is the normalized error function for the x polarization, and u is the adjustment coefficient. The adjustment coefficient, as is well known, controls the rate of converge. A typical range of u for this application could be, without limitation, from $10^{-4}$ to $10^{-2}$.

The outputs of sub-equalizers 133 and 135 are combined, e.g., added, by adder 141 in the manner shown, which is the same manner as if sub-equalizers 133 and 135 had been ordinary sub-equalizers of a conventional CMA equalizer. Similarly, the outputs of sub-equalizers 137 and 139 are combined, e.g., added, by combiner 143 in the manner shown, which is the same manner as if sub-equalizers 137 and 139 had been ordinary sub-equalizers of a conventional CMA equalizer Advantageously, as the determinant of first stage equalizer 131, $$\begin{vmatrix} H_{xx1} & H_{xy1} \\ H_{yx1} & H_{yy1} \end{vmatrix} \text{ which equals, } H_{xx1} \cdot H_{yy1} - H_{xy1} \cdot H_{yx1},$$

can be seen to never approach zero, because of the conditions imposed on its sub-equalizers and initial coefficient constraints, the singularity problem of a conventional CMA single-stage-only equalizer is avoided by the two-stage equalizer.

Second stage equalizer 151 receivers the outputs from combiners 141 and 143 of first stage equalizer 131. For example, in the manner shown, the output from combiner 141, corresponding to the x polarization, is supplied to sub-equalizer 153 and 157 while the output from combiner 143, corresponding to the y polarization, is supplied to sub-equalizer 155 and 159.

Sub-equalizers 153, 155, 157, and 159 of second stage equalizer 151 have a respective transfer function as follows: for sub-equalizer 153, its transfer function is $H_{xx1}$; for sub-equalizer 155, its transfer function is $H_{xy1}$; for sub-equalizer 157, its transfer function is $H_{yy1}$; and for sub-equalizer 157, its transfer function is $H_{yy1}$. Given that the goal is a constant modulus, e.g., a, which if normalized a would have a value of 1, these transfer functions are each adjusted according to its respective associated one of the following equations:

$$H_{xx1}(t+\Delta t) = H_{xx1}(t) - \mu \frac{\partial(\varepsilon_x^2)}{\partial H_{xx1}}$$

$$H_{xy1}(t+\Delta t) = H_{xy1}(t) - \mu \frac{\partial(\varepsilon_x^2)}{\partial H_{xy1}}$$

$$H_{yx1}(t+\Delta t) = H_{yx1}(t) - \mu \frac{\partial(\varepsilon_y^2)}{\partial H_{yx1}}$$

$$H_{yy1}(t+\Delta t) = H_{yy1}(t) - \mu \frac{\partial(\varepsilon_y^2)}{\partial H_{yy1}}$$

where t is the current time period, e.g., current cycle, $t+\Delta t$ represents the next time period, e.g., the next cycle, where $\Delta t$ is the cycle time duration, $\varepsilon_x^2$ is the mean-square error $\varepsilon^2=(a-|x'|^2)^2$ for the x generic, in the general case and $\varepsilon_x^2=(1-|x'|^2)^2$ for the normalized case, $\varepsilon_y^2$ is the mean-square error $\varepsilon_y^2=(a-|y'|^2)^2$ for the y generic, in the general case and $\varepsilon_y^2=(1-|y'|^2)^2$ for the normalized case The coefficients of the four sub-equalizers, sub-equalizers 153, 155, 157, and 159, of second stage equalizer 151 are adjusted independently using the conventional CMA updating, e.g., each may be adjusted according to its respective associated one of the following equations:

$$h_{xx2}^i(t+\Delta t)=h_{xx2}^i(t)+\mu\varepsilon_x x^{i*}x', \ i=1,L,N$$

$$h_{xy2}^i(t+\Delta t)=h_{xy2}^i(t)+\mu\varepsilon_x x^{i*}x', \ i=1,L,N$$

$$h_{yx2}^i(t+\Delta t)=h_{yx2}^i(t)+\mu\varepsilon_y y^{i*}y', \ i=1,L,N$$

$$h_{yy2}^i(t+\Delta t)=h_{yy2}^i(t)+\mu\varepsilon_y y^{i*}y', \ i=1,L,N$$

where $$x' = \sum_{i=1}^{N}(h_{xx2}^i x^i + h_{xy2}^i y^i), \quad y' = \sum_{i=1}^{N}(h_{yx2}^i x^i + h_{yy2}^i y^i)$$

are the two outputs of the equalizer, i.e., the x polarization output from adder 161 and the y polarization from adder 163, respectively, $\varepsilon_x=(1-|x'|^2)$ and $\varepsilon_y=(1-|y'|^2)$ are the respective x polarization and y polarization normalized error functions. Note that first stage equalizer 131 and second stage equalizer 151 should, preferably, use the same number of input samples per cycle time.

The outputs of sub-equalizers 153 and 155 are combined, e.g., added, by adder 161 in the manner shown, which is the conventional manner for a CMA equalizer. The output of combiner 161 is the x polarization generic. Similarly, the outputs of sub-equalizers 157 and 159 are combined, e.g., added, by adder 163 in the manner shown, which is the conventional manner for a CMA equalizer. The output of combiner 163 is the y polarization generic.

At a conceptual level, first stage equalizer 131 compensates for PMD and performs a rough polarization demultiplexing. Second stage equalizer 151 compensates for polarization-dependent loss (PDL) and any residual CD that is not fully compensated for by a CD compensator which is before the two-stage equalizer. Advantageously, as the determinant of the first stage never approaches zero, because of the conditions imposed on its sub-equalizers and initial coefficient constraints, the singularity problem of a conventional CMA single-stage-only equalizer is avoided by the two-stage equalizer.

The x and y generics are supplied from second stage equalizer 151 to conventional carrier phase estimator 171. Conventional phase estimator 171 removes the phase noise and the phase drift. Typically these are the same for x and y when the same laser was used to initially generate each of the generic polarizations.

Typically, the x polarization and the y polarization are processed separately carrier phase estimator 171, so there may be two distinct phase estimation units, e.g., one for x and one for y, performing the phase estimation within carrier phase estimator 171, even when the effect of the phase noise and phase drift is the same on both of the x polarization and the y polarizations. Carrier phase estimator 171 supplies a single output for the x generic and a single output for the y generic. These outputs are supplied to symbol identification and forward error correction unit 173, e.g., in the manner shown, which is conventional.

Symbol identification and forward error correction unit 173 identifies and extracts the data symbols from the x and y generics and performs any error correction necessary, e.g., forward error correction, and produces a stream of output data. Of course, it is possible that the x and y generics were each carrying an independent data stream, rather than a substream derived from a single data stream. In such a situation, the independent data streams are extracted and corrected independently.

What is claimed is:

1. An optical receiver comprising:
    a first stage equalizer arranged to implement a modified constant modulus algorithm (CMA) equalization and supply a modified-equalized output; and
    a second stage equalizer arranged to implement a constant modulus algorithm (CMA) equalization, said second stage receiving as input said output from said first stage equalizer.

2. The invention as defined in claim 1 wherein said first stage equalizer further comprises four sub-equalizers only two of which are independent.

3. The invention as defined in claim 2 further comprising a combiner that combines outputs from said two independent sub-equalizers to produce an x polarization output.

4. The invention as defined in claim 2 wherein a first of said two independent sub-equalizers receives an x polarization input and a second of said independent sub-equalizers receives a y polarization input.

5. The invention as defined in claim 2 further comprising a combiner that combines outputs from said two dependent sub-equalizers to produce a y polarization output.

6. The invention as defined in claim 1 wherein at least one of said equalizers is a complex equalizer.

7. The invention as defined in claim 1 wherein said first stage equalizer is adapted to compensate for polarization mode distortion.

8. The invention as defined in claim 1 wherein said second stage equalizer further comprises four sub-equalizers.

9. The invention as defined in claim 1 wherein said second stage equalizer is adapted to compensate for polarization-dependent loss.

10. The invention as defined in claim 1 further comprising a chromatic dispersion compensator which supplies its output as input to said first stage equalizer and wherein said second stage equalizer is adapted to compensate for residual chromatic dispersion that remains in said output of said chromatic dispersion compensator CD compensator.

11. The invention as defined in claim 10 further comprising a coherent detector for supplying a digital representation of a received polarization multiplexed optical signal as an input to said chromatic dispersion compensator.

12. The invention as defined in claim 11 further comprising an optical signal input port for receiving said polarization multiplexed optical signal.

13. The invention as defined in claim 1 wherein said first stage equalizer is characterized by a determinant and said first stage equalizer is arranged such that said determinant of said first stage never approaches zero.

14. The invention as defined in claim 1 further comprising a carrier phase estimator which receives as an input a generic signal supplied as an output by said second stage equalizer.

15. The invention as defined in claim 14 further comprising a symbol identification and error correction unit that receives as an input at least one output from said carrier phase estimator.

16. The invention as defined in claim 1 wherein said first stage equalizer is characterized by a transfer function and said transfer function is normalized to a unitary matrix.

17. An optical receiver comprising:
first means for equalizing arranged to implement a modified constant modulus algorithm (CMA) equalization and supply a modified-equalized output; and
second means for equalizing arranged to implement a constant modulus algorithm (CMA) equalization, said second stage receiving as input said output from said first stage.

18. The invention as defined in claim 17 wherein said first means for equalizing is characterized by a determinant and said first means for equalizing is arranged such that said determinant of said first means for equalizing never approaches zero.

19. A method for processing a partially processed digital representation of a received optical signal having x and y polarizations, said method comprising the steps of:
passing said processed digital representation of said optical signal through a first stage equalizer arranged to implement a modified constant modulus algorithm (CMA) equalization and supply a modified-equalized output; and
passing said modified equalized output through a second stage equalizer arranged to implement a constant modulus algorithm (CMA) equalization, said second stage receiving as input said modified-equalized output from said first stage and supplying as output respective x and y polarization generics.

20. An integrated circuit arranged as a constant modulus algorithm equalizer comprising:
a first stage equalizer which supplies a modified-equalized output, said first equalizer stage being arranged to implement a modified constant modulus algorithm equalization such that its determinant never approaches zero; and
a second stage equalizer arranged to implement a constant modulus algorithm equalization, said second stage receiving as input said output from said first stage;
whereby the singularity problem of a conventional CMA single-stage-only equalizer is avoided.

21. The invention as defined in claim 20 wherein said first stage equalizer further comprises four sub-equalizers only two of which are independent.

* * * * *